United States Patent [19]

Akahane

[11] Patent Number: 5,697,060
[45] Date of Patent: Dec. 9, 1997

[54] PORTABLE VOICE MESSAGE TERMINAL CAPABLE OF TRANSMITTING PRE-SET TEXT-BASED INFORMATION

[75] Inventor: Masaaki Akahane, Mahwah, N.J.

[73] Assignees: Sony Corporation, Tokyo, Japan; Sony Electronics Inc., Park Ridge, N.J.

[21] Appl. No.: 622,512

[22] Filed: Mar. 25, 1996

[51] Int. Cl.$^6$ .................................................. H04Q 7/08
[52] U.S. Cl. ........................... 455/38.1; 455/89; 455/95; 455/228; 340/825.44
[58] Field of Search ............................. 455/38.1, 38.2, 455/73, 89, 91, 95, 228; 340/825.44, 825.45

[56] References Cited

U.S. PATENT DOCUMENTS

| | | | |
|---|---|---|---|
| 3,976,995 | 8/1976 | Sebestyen | 340/825.44 |
| 4,684,941 | 8/1987 | Smith et al. | 340/825.44 X |
| 4,885,577 | 12/1989 | Nelson | 340/825.44 |
| 5,073,972 | 12/1991 | Tendler et al. | 455/38.2 |

*Primary Examiner*—Reinhard J. Eisenzopf
*Assistant Examiner*—Philip J. Sobutka
*Attorney, Agent, or Firm*—Lise A. Rode, Esq.; Pasquale Musacchio, Esq.; Jerry A. Miller

[57] ABSTRACT

A portable wireless voice message transmitter over packet switched network for transmitting a voice message is provided. The transmitter is capable of transmitting a voice message and text-based information when a user makes an emergency call to a special address with which the text-based information is associated. The transmitter includes text-based information setting circuit for setting text-based information, a first memory for storing the text-based information, a special address setting circuit for setting a special address which is associated with the text-based information and a second memory for storing the special address. The transmitter also includes a microphone for inputting a voice message, a third memory for storing the voice message, a destination setting circuit for setting a destination, a transmission start key operable by a user for generating a transmission start signal and a transmitter circuit responsive to the transmission start signal for transmitting the voice message stored to the destination address. When the destination address is coincident with the special address stored in the first memory, the transmitter circuit transmits the text-based information as well as the voice message to the destination address so that the message recipient receives both the voice message and the text-based information.

5 Claims, 5 Drawing Sheets

PORTABLE VOICE MESSAGE TERMINAL CAPABLE OF TRANSMITTING PRE-SET TEXT-BASED INFORMATION

BACKGROUND

1. Field of the Invention

This invention relates to a wireless voice messaging system for transmitting a voice message signal over packet switched network. More particularly, this invention relates to a wireless voice messaging system for transmitting a voice message signal and a text-based information signal at the same time when a user sends the voice message to a special address such as an emergency number.

2. Background of the Invention

Personal communication systems for enabling users to communicate with each other have become popular in the recent years. While in the past such systems have generally been realized using analog technology, it is desirable to instead use digital processing in order to use limited frequency resources more efficiently as well as reduce signal distortion and degradation and thus improve the overall quality of the voice signal.

In general, in a digital cellular telephone system for transmitting and receiving digital voice signals, an input voice signal is digitized and encoded to speech parameters. A variety of speech encoding/decoding methods have been known for processing digital voice signals. For example, MBE (Multi Band Excitation), SBE (Single Band Excitation), SBC (Sub-Band Coding), Harmonic Coding, LPC (Linear Predictive Coding), DCT (Discrete Cosine Transform), MDCT (Modified DCT) and FFT (Fast Fourier Transform) have been known as such a encoding/decoding method. In addition, CELP (Code Excited Linear Prediction), VSELP (Vector Sum Excited Linear Prediction), PSI-CELP (Pitch Synchronous Innovation—CELP) and RPE-LTP (Regular Pulse Excitation—Long Term Prediction) have also become known as a speech encoding method for digital cellular telephone systems.

Such a digital cellular telephone system is called a circuit switched communication and two or more users can interactively communicate with each other in realtime. During the interactive communication, a signal line is physically established exclusively for the communicating users. The cellular telephone system is relatively expensive because the users are charged for the exclusive use of the channel, for example, per minute basis. Even when a user just wants to send a simple voice message for a short period, the service takes a high charge for using a cellular network in conjunction with PSTN (Public Switch Telephone Network).

Unlike a cellular telephone system for a realtime communication, packet switched communication systems are also known. Packet switched communication systems are considered as non-realtime communication systems. One of the non-realtime communication systems is a one-way pager which is capable of receiving a text-based (either numeric or alphabetical) short message. A two-way pager terminal is also known for providing limited capability of transmitting and full capability of receiving a text-based short message. For the non-realtime communication system, there is no need to establish an exclusive channel between the communicating users. Therefore, the charge for the system is based on the amount of data transmitted, for example, per byte basis. Such a pager system can handle only a text-based message.

In the more distant future, however, two-way voice messaging terminals over packet switched network are planned to be commercially introduced. In such two-way voice messaging systems, it is anticipated that a user will be able to transmit a voice message to a receiving terminal which, in turn, will have the capability of responding to such transmitting terminals with a voice message response.

However, users of such a voice messaging system are able to send a relatively short message only, for example, 10-second voice message, due to a limited storage capacity of a memory for storing the voice message as well as expensive air charge. Such a short talk time is sometimes not long enough. Especially, in case of an emergency call such as a call to a police station or a call to a road assistance service, users must inform the call recipient of various information within a restricted amount of time. Such various information may include not only the current emergency situation and location but also some basic information such as the caller's name, address, telephone number, driver's license number, membership identification, health/medical conditions and so on. Under the pressure caused by the emergency occurrence, the user cannot be expected to communicate all necessary information accurately and concisely in a short talk time.

It would be desirable, therefore, for the user sending the voice message to have the capability of sending all necessary information even under the emergency situation.

SUMMARY OF THE INVENTION

Accordingly, it is one object of the present invention to provide a wireless two-way voice messaging system over packet switched network, which system is capable of transmitting a voice message and other basic information about the user who transmits the voice message.

It is another object of the present invention to provide a wireless two-way voice messaging system which enables the user to send a voice message and a preset text-based information when the user makes a call to a special address such as an emergency number.

In accordance with the present invention, there is provided a portable voice message transmitter capable of transmitting a voice message as well as text-based information when a user makes a call to a special address with which the stored text-based information is associated. The transmitter includes a text-based information setting circuit for setting text-based information, a first memory for storing the text-based information, a special address setting circuit for setting a special address which is associated with the text-based information and a second memory for storing the special address. The transmitter also includes a microphone for inputting a voice message, a third memory for storing the voice message, a destination setting circuit for setting a destination address, a send key operable by a user for generating a send signal and a transmitting circuit responsive to the send signal for transmitting the voice message to the destination address. When the destination address is coincident with the special address stored in the first memory, the transmitting circuit transmits the text-based information as well as the voice message to the destination address so that the message recipient receives both the voice message and the text-based information.

In accordance with the present invention, when the user of the transmitter makes a call to a special address such as an emergency number, he only needs to send a brief voice message describing the current situation. Other basic information such as his full name, address and so on is automatically transmitted to the special address in the form of text-based information.

DETAILED DESCRIPTION OF THE PREFERRED EMBODIMENT

Referring to the accompanying drawings, an embodiment of the voice message transmitter/receiver according to the present invention will be described hereinafter.

Figure 1:
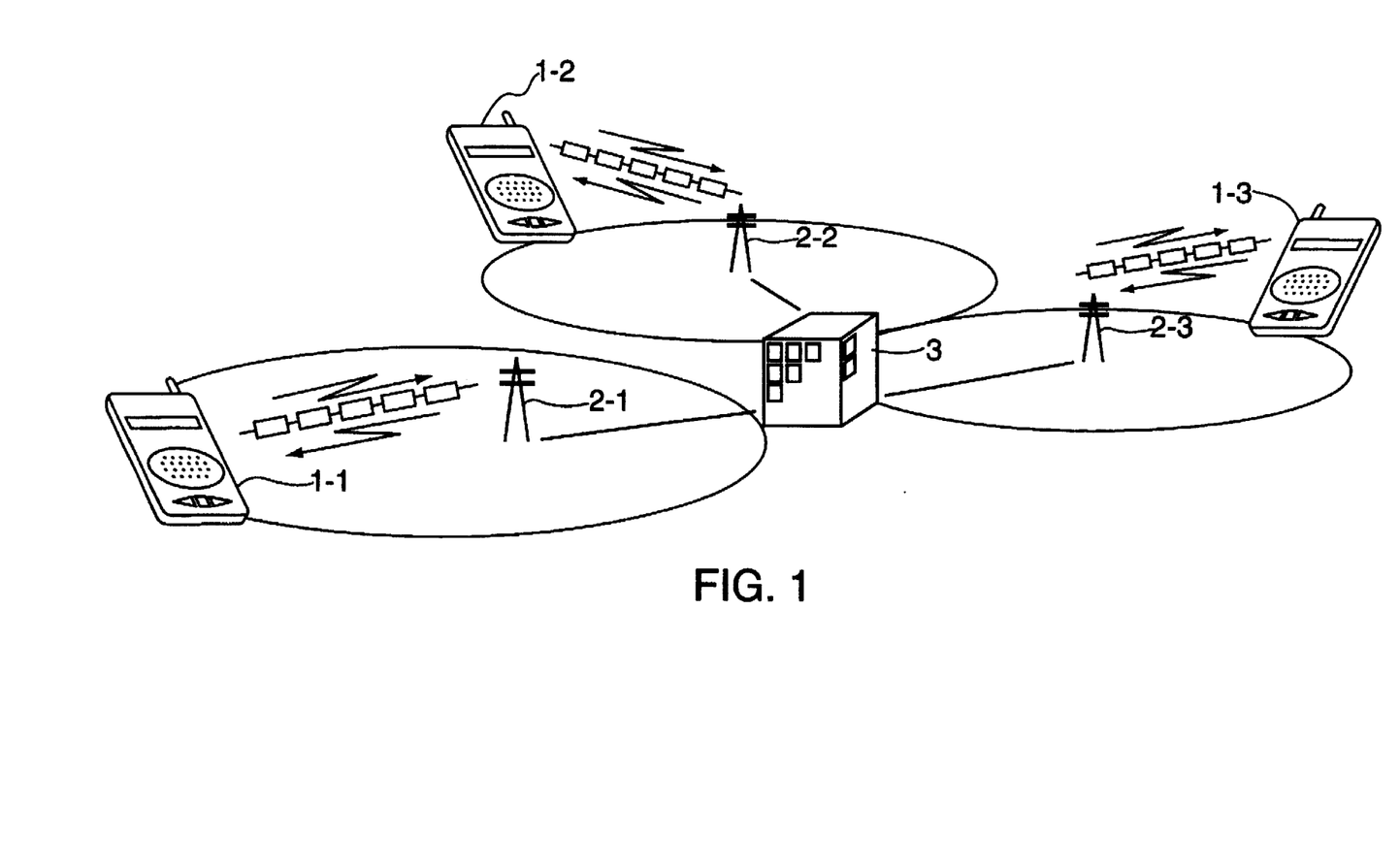
FIG. 1 shows a wireless two-way voice messaging system over packet switched network, to which system the present invention applies.

FIG. 1 shows a wireless voice messaging system to which the present invention applies. Portable radio transmitter/receiver terminals 1-1, 1-2 and 1-3 are provided for users. If a user of terminal 1-1 wants to send a voice message to a user of terminal 1-2, the user of terminal 1-1 inputs a voice message through a microphone and sets a destination address specifying terminal 1-2 as a destination. Terminal 1-1 encodes the input voice message and transmits an encoded message as well as the destination address to a base station 2-1 which covers an area where terminal 1-1 is located. The encoded message and the destination address are transmitted over the air as packet data.

Base station 2-1 receives the packet data transmitted from terminal 1-1 and transfers the received packet data to a network switching control center 3. Network switching control center 3 sends the packet data to a destination base station 2-2 which covers an area where destination terminal 1-2 is located. Base station 2-2 transmits the packet data over the air to destination terminal 1-2 in accordance with the destination address included in the packet data. When terminal 1-2 receives a complete message, a beep, vibration or other conventional notification tells the user of terminal 1-2 of arrival of a new incoming message. The user of terminal 1-2 can retrieve the new incoming message when he reproduces it through a speaker on terminal 1-2.

Figure 2:
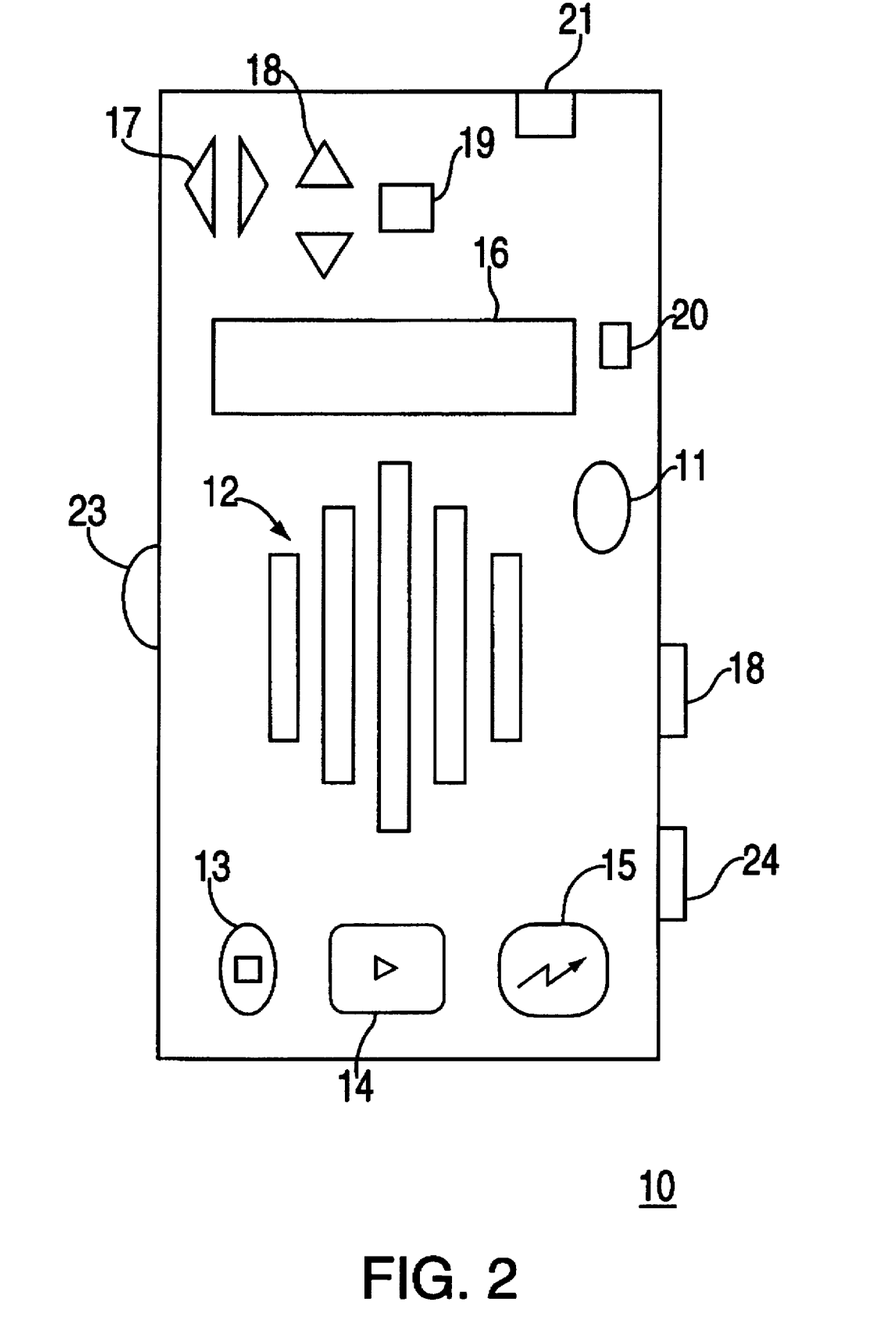
FIG. 2 shows a voice message transmitter/receiver terminal according to the present invention.

FIG. 2 shows an embodiment of a wireless voice message transmitter/receiver terminal according to the present invention. Voice message transmitter/receiver terminal 10 has microphone 11, speaker 12, record key 13, playback key 14, send key 15, LCD display 16, cursor keys 17, up/down keys 18, enter key 19, display select key 20, LED indicator 21, delete key 22, volume key 23 and interface port to external device 24.

When a user wants to send a voice message, he must record the voice message first. While holding down record key 13, the user speaks a voice message through microphone 11. After the input voice message is encoded to an encoded data, the encoded data is stored in an inside memory which is not shown in FIG. 2. If the user wants to hear the input voice message before sending it, he can do so by pushing playback key 14. The encoded data read from the memory is decoded and the input voice message is reproduced from speaker 12. If the user does not like the input voice message, he can delete it from the memory by pushing delete key 22 and record a new voice message in the same manner. When the user is satisfied with the input voice message which he has recorded, he sets a destination address. After setting the destination address, the user can push send key 15 at any time. The voice message is transmitted to a corresponding base station as described above in conjunction with FIG. 1.

LCD display 16 selectively displays a destination address and other text-based information as the user selects by operating display select key 20. When the user sets a new destination address, he first operates display select key 20 so that LCD display 16 is put in a destination display mode. Then, the user operates cursor keys 17 and up/down keys 18 to set a desired destination address on LCD display 16. Cursor keys 17 are used for moving a cursor in LCD display 16 in right and left directions and up/down keys 18 are used for incrementing and decrementing a character/numeral at the position of the cursor in a conventional manner.

After a desired destination address is set, the user pushes send key 15 to transmit the voice message. If the user wants to register the destination address for the future use, he pushes enter key 19 so that the destination address is registered in an address list stored in an inside memory which is not shown in FIG. 2. In addition to incrementing and decrementing functions as described above, up/down keys 18 are also used to scroll up/down the address list displayed on LCD display 16 so that any address previously registered in the address list can be recalled.

Text-based information can also be set in a way similar to the destination address setting. The user first selects a text display mode by operating display select key 20 so that LCD display 16 is switched to display text-based information. Then, the user operates cursor keys 17 and up/down keys 18 to set desired text-based information in a conventional manner. Alternatively, the text-based information can be inputted by using an external device such as a personal computer, which can edit text based information. In that case, the text-based information edited by the external device can be downloaded into transmitter/receiver terminal 10 through interface 24 as shown in FIG. 2.

The text-based information usually includes information about the user himself such as his full name, address, telephone number, date of birth, membership ID number, drivers license number, health/medicine conditions and so on. After the user inputs desired text-based information, he pushes enter key 19. Then, LCD display 16 is automatically switched to the destination display mode again so that the user can set a special address. The user can set the special address by either setting a new address or recalling one of the destination addresses from the address list. After a desired special address is displayed on LCD display 16, the user again pushes enter key 19. When enter key 19 is pushed for the second time, the text-based information is stored in an inside memory (not shown) associated with the special address displayed on LCD display 16.

After the text-based information setting is complete, when the user sends a voice message to a special address with which text-based information is registered and associated, the text-based information is automatically retrieved from the memory and transmitted to the destination address together with the voice message. The user need not do anything particular to send the text-based information. Whenever the user chooses as a destination the special address with which some text-based information has been registered and associated, the transmission of the text-based information is automatic with the transmission of the voice message.

Transmitter/receiver 10 is also capable of receiving an incoming voice message. When a new incoming voice message is received, LED indicator 21 is lit. The user can playback the received incoming voice message by pushing playback key 14. Then, the incoming voice message is reproduced from speaker 12. Volume key 23 is used for controlling the playback volume. Delete key 22 is used to delete from the inside memory either the recorded outgoing message or the received incoming message.

Figure 3:
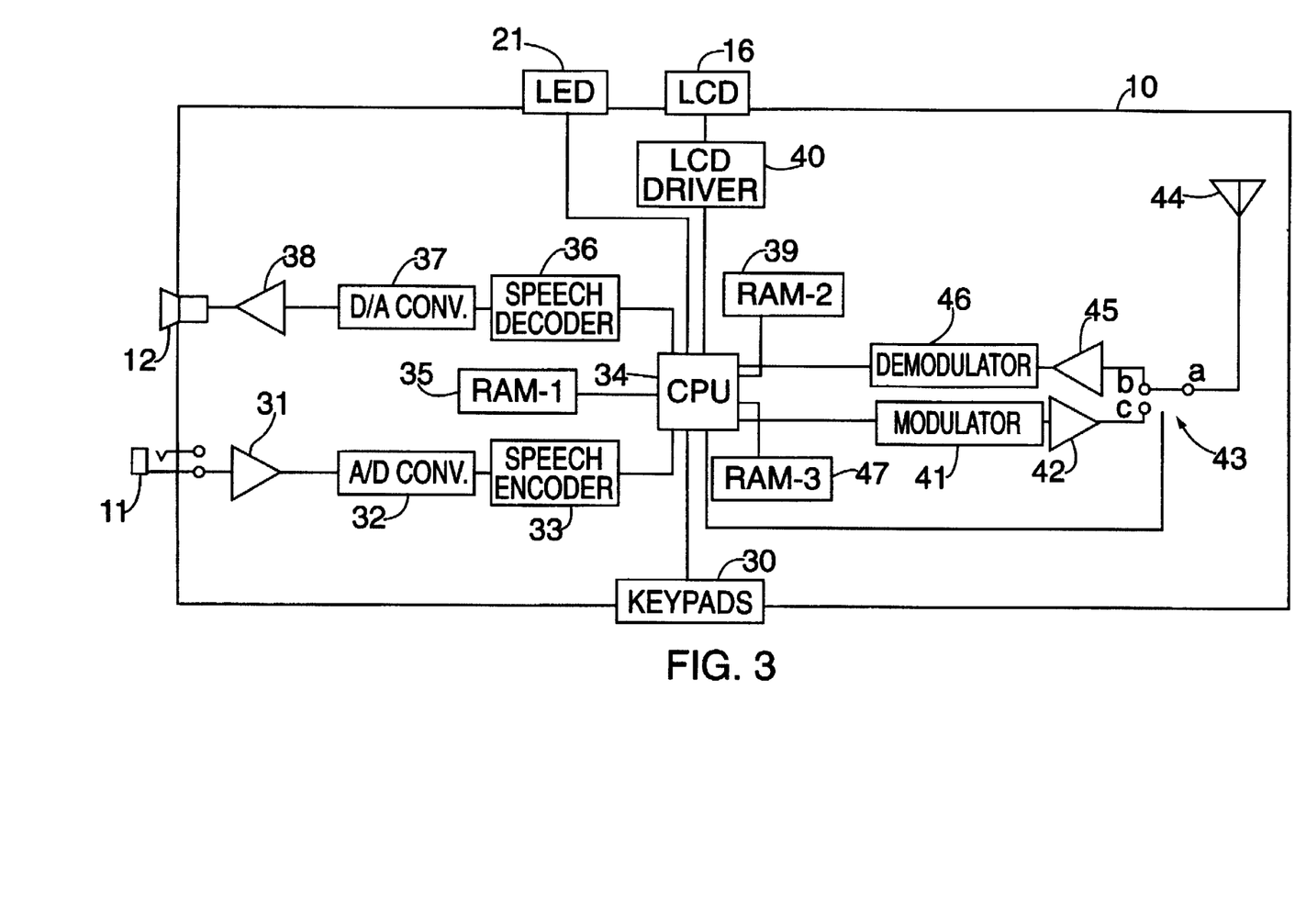
FIG. 3 is a block diagram showing an embodiment of internal circuits included in a voice message transmitter/receiver terminal according to the present invention.

FIG. 3 is a block diagram showing an embodiment of internal circuits of transmitter/receiver terminal 10. In FIG. 3, microphone 11, speaker 12, LCD display 16, LED 21 are indicated by the same reference numerals as used in FIG. 2. Record key 13, playback key 14, send key 15, cursor keys 17, up/down keys 18, enter key 19 and display select key 20 shown in FIG. 2 are also shown collectively as keypads 30 in FIG. 3.

When the user wants to send a voice message to someone, he first operates the record key in keypads 30. While the user holds down the record key, he speaks a voice message into microphone 11. Microphone 11 transforms the input voice message into a voice signal and supplies it to amplifier 31. Amplifier 31 supplies an amplified voice signal to A/D converter 32 which converts the same to a digital voice signal. A/D converter 32 supplies the digital voice signal to speech encoder 33. Speech encoder 33 encodes the digital voice signal to an encoded data. The encoded data is supplied from speech encoder 33 to CPU 34 and then, stored in RAM-1 35. When the user finishes an entire voice message, he releases the record key in keypads 30.

The user can hear the input voice message before transmitting it. When the user pushes the playback key in keypads 30, CPU 34 reads the encoded data from RAM-1 35 and supplies it to speech decoder 36. Speech decoder 36 decodes the encoded data to a decoded voice signal. After the decoded voice signal is D/A-converted by D/A converter 37 and amplified by amplifier 38, the input voice message is reproduced from speaker 12.

Speech encoder 33 may use various kinds of high-efficiency encoding methods. As mentioned above in the background, such a speech encoding method may be Multi Band Excitation (MBE), Single Band Excitation (SBE), Sub-band Coding (SBC), Harmonic Encoding, Linear Predictive Coding (LPC), Discrete Cosine Transforming (DCT), Modified Discrete Cosine Transforming (MDCT), Fast Fourier Transforming (FFT), Code Excited Linear Predictive (CELP) coding, Vector Sum Excited Linear Predictive (VSELP) coding, Pitch Synchronous Innovation-CELP (PSI-CELP) coding and Regular Pulse Excitation Long Term Prediction (RPE-LTP) coding. By using any one of these encoding methods or other similar encoding method, an amount of the digital signal from A/D converter 32 can be suppressed with acceptable degradation of quality of the voice message. Alternatively, the digital signal can be directly supplied from A/D converter 32 to RAM-1 35 without being encoded by speech encoder 33 even though RAM-1 35 would need more storage capacity than when speech encoder 33 is used.

After recording a voice message, the user needs to set a destination address to which the voice message is transmitted. The user can either set a new destination address or recall one of the destination addresses registered in an address list stored in RAM-2 39. To set a new destination address, the user operates the cursor keys and the up/down keys in keypads 30 in a manner described above in conjunction with FIG. 2 while he watches LCD display 16 which is controlled by LCD driver 40. If the user wants to, the newly set destination address can be added to the address list stored in RAM-2 39. Instead of setting a new address, the user can recall one of the destination addresses from the address list. The user operates the up/down keys in keypads 30 until a desired destination address is recalled from RAM-2 39 and displayed on LCD display 16.

Once the user sets a destination address, he pushes the send key in keypads 30. CPU 34 reads the encoded data from RAM-1 35 and supplies it to modulator 41. At the same time, CPU 34 controls switch circuit 43 so that fixed contact a of switch circuit 43 is connected to movable contact c thereof. Otherwise, fixed contact a of switch circuit 43 is connected to movable contact h thereof so that transmitter/receiver terminal 10 is ready to receive an incoming voice message. Modulator 41 modulates the encoded data to a modulated signal and supplies the modulated signal to amplifier 42 which amplifies the same. The amplified signal is transmitted through switch circuit 43 and antenna 44 to the base station.

When transmitter/receiver terminal 10 receives an incoming voice message, antenna 44 receives a signal transmitted from the base station. The received signal is supplied through switch circuit 43 to amplifier 45. Amplifier 45 supplies an amplified signal to demodulator 46 which supplies a demodulated signal to CPU 34. CPU 34 supplies the demodulated signal to RAM-1 35. At the same time, CPU 34 controls LED 21 to be lit so that the user knows the arrival of the incoming voice message. When the user operates the playback key in keypads 30, the demodulated signal read from RAM-1 35 is supplied to speech decoder 36 which produces an decoded signal. After the decoded signal is D/A-converted by D/A converter 37 and amplified by amplifier 38, the incoming voice message is reproduced from speaker 12.

In addition to sending a voice message, the user can also set in advance text-based information associated with a special address. If the user is a member of a road assistant service, for example, he may have the road assistant service's emergency number registered in the address list stored in RAM-2 39. Associated with the emergency number of the road assistant service, the user can set any information as text-based information. Such text-based information may include the user's full name, address, date of birth, member's ID number, driver license number, its expiration date and so on.

By using the cursor keys and the up/down keys in keypads 30, the user inputs various text-based information. The text-based information thus inputted is stored in RAM-3 47. After the user finishes setting the text-based information, he pushes the enter key in keypads 40. LCD display 16 is then switched to an address setting mode. The user sets a special address with which the text-based information is associated, either by setting a new address or by recalling one of the addresses stored in RAM-2 39. When the user pushes the enter key again, CPU 34 adds to the special address a text ID. flag showing which text-based information stored in RAM-3 is associated with the special address. The special address added with the text ID. Flag is stored in RAM-2 39. Though the text-based information is set before the special address is set in this embodiment, the order of setting the text-based information and the special address can be reversed.

When the user encounters an emergency situation on a road and needs the road assistance, he first inputs a voice message while holding down the record key in keypads 30. Since the user has to only communicate a limited amount of information by voice message, such as his current location and the emergency status, a talk time of 10 to 15 seconds is sufficient for him to communicate such information. The user does not have to mention any other basic information such as his full name and membership ID number. After the user inputs the voice message, he recalls the address of the road assistance service from the address list stored in RAM-2 39. When the user chooses the address of the road assistance service, CPU 34 finds that the text ID. flag is attached to that address. The text ID. flag tells CPU 34 that there is text-based information associated with the address of the road assistance service. Because the text ID. flag tells which text-based information among various text-based information stored in RAM-3 47 is associated with the address, CPU 34 retrieves from RAM-3 47 the text-based information associated with the address of the road assistance service.

When the user pushes the send key in keypads 30, CPU 34 supplies to modulator 41 the encoded data read from RAM-1 35, the address of the road assistance service read from RAM-2 39 and the associated text-based information read from RAM-3 47. Modulator 41 supplies a modulated signal to amplifier 42 and the amplified signal is transmitted from antenna 44. As described above, when the user makes an emergency call, he need not do anything to retrieve and send the text-based information. Transmission of the text-based information associated with the special address is automatically done whenever the special address is chosen as a destination address.

The road assistance service station receives the voice message transmitted from the user. In the road assistance service station, there is provided both a voice message receiver capable of receiving and reproducing voice messages, and a text receiver capable of receiving and displaying text-based information. An operator at the service station listens to the voice message and knows what happens to its member and where it happens. The operator also sees on a display the text-based information transmitted with the voice message. The operator knows the sender's full name, address, membership ID. number and all other necessary information displayed as text-based information.

Figure 4:
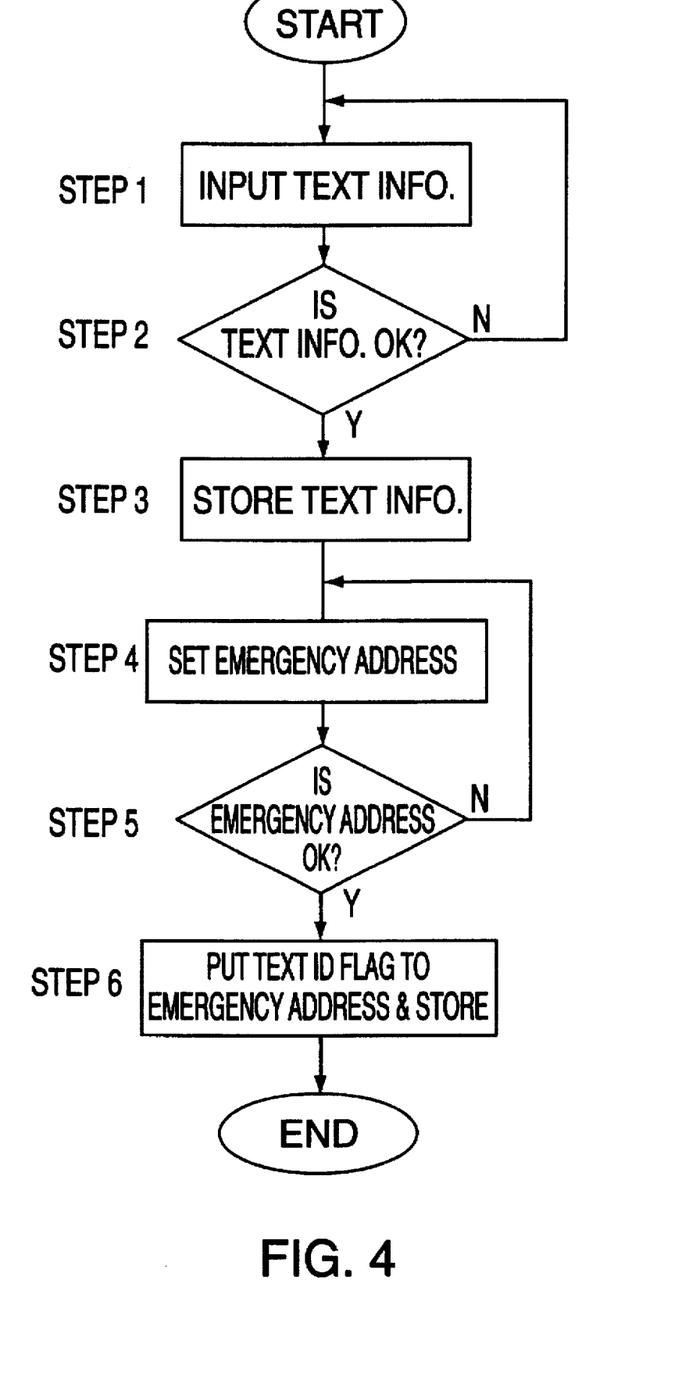
FIG. 4 is a flow-chart to explain the steps of setting text-based information associated with a special address.

FIG. 4 is a flow-chart to explain the steps of setting text-based information associated with a special address. A user first inputs text-based information about the user himself in step 1. Such text-based information may include the user's full name, address, telephone number, date of birth, membership I.D., driver license number, license plate number and so on. These are information necessary to be communicated when the user makes an emergency call to the special address. These items may be specified by the service provider side in advance. The format of this information may be ASCII, but a special format may also be acceptable. In step 2, while watching the input text-based information on a display, the user determines whether the input text-based information is satisfactory. If the user is not satisfied with the text-based information, he goes back to step 1 and inputs new text-based information. If the user is satisfied with the text-based information, the text-based information is stored in a text memory in step 3.

After the user sets the text-based information, he sets a special address to which the text-based information is transmitted when the user makes an emergency call to the special address later. In step 4, the user sets a special address either by inputting a new address or by recalling one of the addresses from the address list stored in an address memory. In step 5, the user determines whether the special address is correctly set. If the special address is not correctly input, the user goes back to step 4 and enters a special address correctly. If it is determined in step 5 that the special address is correctly set, in step 6 the special address is stored in the address memory with a text I.D. flag indicating which text-based information stored in the text memory is associated with the special address. The same text-based information may be associated with several special addresses.

Figure 5:
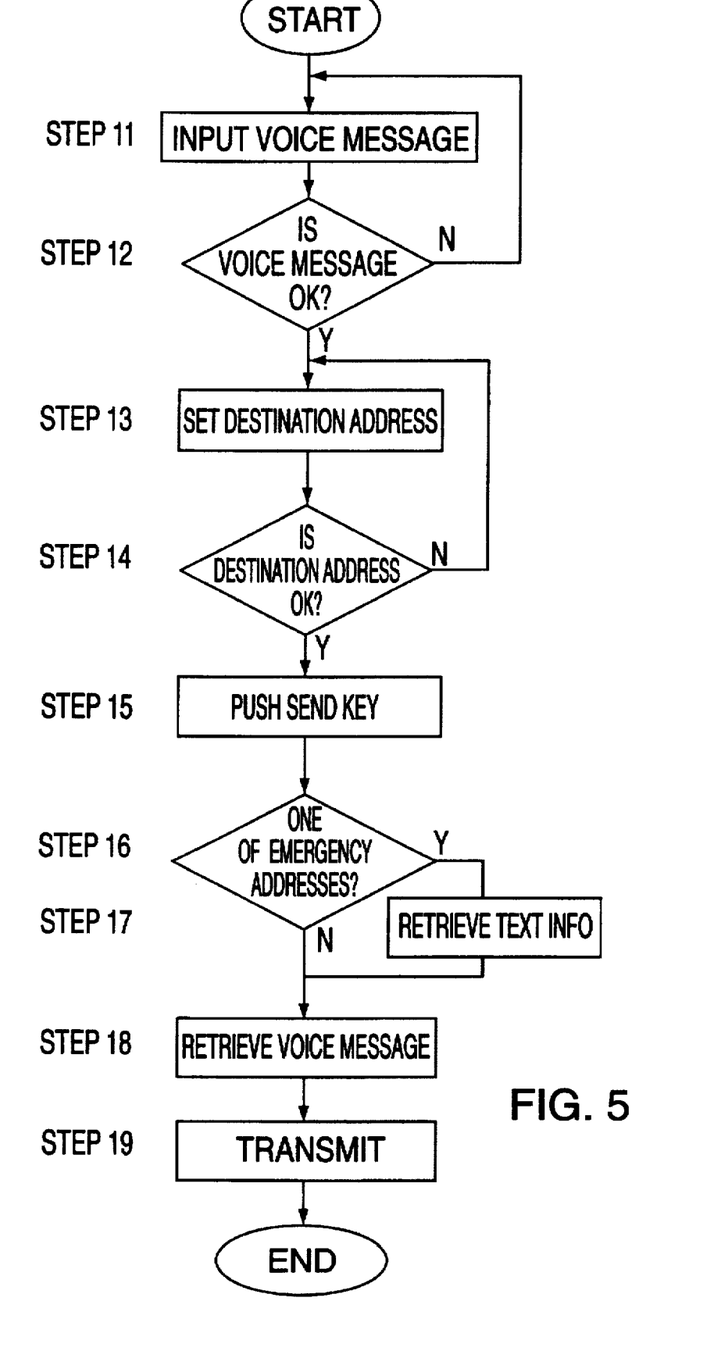
FIG. 5 is a flow-chart to explain the steps of sending a voice message and text-based information.

Regardless of whether text-based information is set associated with a special address, the user can send a voice message at anytime. FIG. 5 is a flow-chart to explain the steps the user needs to take when he wants to send a voice message. First, in step 11, the user inputs a voice message. The voice message is encoded and stored in a voice memory. In step 12, if he wants, the user can reproduce the input voice message from a speaker so that he can determine whether the input voice message is satisfactory. If the input voice message is not satisfactory, the user goes back to step 11 and inputs a new voice message. If the user is satisfied with the input voice message, he has to set a destination address to which the voice message is transmitted. In step 13, the user sets a destination address either by inputting a new destination address or by recalling one of the addresses from the address list stored in the address memory. In step 14, the user determines if the correct destination address is set. If not, the user goes back to step 13 so that he can enter the correct destination address.

After the correct destination address is set, the user can push a send key at any time in step 15. When the send key is pushed, it is determined in step 16 whether the destination address is one of the special addresses with which the text-based information is associated. If the destination address is not any one of the special addresses, the voice message is retrieved from the voice memory in step 18. After modulation and amplification, the retrieved voice message is transmitted from an antenna in step 19.

On the other hand, if it is determined in step 16 that the destination address is one of the special addresses, the text-based information associated with the destination address (which is a special address) is retrieved from the text memory in step 17. Then, the voice message is retrieved from the voice memory in step 18. Both the text-based information retrieved in step 17 and the voice message retrieved in step 18 are modulated, amplified and finally transmitted from the antenna in step 19.

Though the above-described embodiment of the invention has been explained with an example of emergency call to a road assistant service, the invention can be applied to various kinds of emergency situations. For example, a user with some health problems known to himself may want to set the 911 number as an emergency number. He might want to set as text-based information medical information such as his medical history, a type of the medicine he uses and so on. Therefore, it is to be understood that numerous changes and modifications may be made by those skilled in the art without departing from the scope of the present invention.

What is claimed is:

1. A portable voice message terminal for communicating with a base station connected to a communication network comprising:

first memory means for storing text-based information;

second memory means for storing a special address, said special address being associated with said text-based information stored in said first memory means;

voice message input means operable by a user for inputting a voice message;

third memory means for storing said voice message;

destination setting means operable by the user for setting a destination address to which said voice message is eventually transmitted;

transmission start means operable by the user for generating a transmission start signal;

transmitting means responsive to said transmission start signal for transmitting said voice message stored in said third memory means via said base station to said destination address, wherein said transmitting means transmits said text-based information and said voice message via said base station to said destination address when said destination address corresponds to said special address stored in said second memory means.

2. The portable voice message terminal according to claim 1, further comprising:

text-based information setting means operable by the user for setting said text-based information to be stored in said first memory means.

3. The portable voice message terminal according to claim 1, further comprising:

special address setting means operable by the user for setting said special address to be stored in said second memory means.

4. The portable voice message terminal according to claim 1, further comprising:

encoding means for encoding said voice message inputted through said voice message input means and for producing an encoded data, wherein said third memory means stores said encoded data as said voice message and said transmitting means transmits said encoded data.

5. A portable voice message terminal for communicating with a base station connected to a communication network comprising:

a text-based information setting circuit for setting text-based information;

a first memory for storing said text-based information;

a special address setting circuit for setting a special address, said special address being associated with said text-based information stored in said first memory;

a second memory for storing said special address;

a microphone for inputting a voice message;

an encoder for encoding said voice message inputted through said microphone and for providing an encoded data corresponding to said voice message;

a third memory for storing said encoded data provided by said encoder;

a destination setting circuit for setting a destination address to which said encoded data is eventually transmitted;

a transmission start key operable by a user for generating a transmission start signal;

a transmitter circuit responsive to said transmission start signal for transmitting said encoded data stored in said third memory in said base station to said destination address, wherein said transmitter circuit transmits said text-based information and said encoded data via said base station to said destination address when said destination address corresponds to said special address stored in said second memory.

* * * * *